United States Patent [19]

Birbara et al.

[11] Patent Number: 5,174,974
[45] Date of Patent: Dec. 29, 1992

[54] REGENERABLE CO₂/H₂O SOLID SORBENT

[75] Inventors: Philip J. Birbara, Windsor Locks; Timothy A. Nalette, Tolland, both of Conn.

[73] Assignee: United Technologies Corporation, Hartford, Conn.

[21] Appl. No.: 767,601

[22] Filed: Sep. 30, 1991

Related U.S. Application Data

[62] Division of Ser. No. 544,716, Jun. 27, 1990, Pat. No. 5,091,358.

[51] Int. Cl.⁵ .................. B01D 53/02; B01D 53/14
[52] U.S. Cl. ............................. 423/230; 55/35
[58] Field of Search ............ 423/230, 220, 232, 438, 423/419 P, 419 R, 604, 210; 55/74, 68, 35; 128/205.28

[56]  References Cited

U.S. PATENT DOCUMENTS

| 2,769,016 | 10/1956 | Lichtenwalter et al. | 502/348 |
| 3,232,028 | 2/1966 | McDonald et al. | 502/415 |
| 3,489,693 | 1/1970 | Bovard | 423/230 |
| 3,511,595 | 5/1970 | Fuchs | 423/230 |
| 3,557,011 | 1/1971 | Colombo et al. | 423/230 |
| 3,619,130 | 11/1971 | Ventriglio | 502/55 |
| 3,865,924 | 2/1975 | Gidaspow et al. | 423/230 |
| 4,822,383 | 4/1989 | Brose et al. | 55/68 |

OTHER PUBLICATIONS

Colombo, G. V. "Study of $CO_2$ Sorbents for Extravehicular Activity" NASA Paper CR114632 published Jul. 1973.

Primary Examiner—Wayne Langel
Assistant Examiner—Peter T. DiMauro
Attorney, Agent, or Firm—Pamela J. Curbelo

[57] ABSTRACT

This invention relates to a $CO_2/H_2O$ sorbent comprised of silver oxide, a $CO_2$ sorption promoter, and a support. Preparation of this sorbent consists of impregnating the support with a silver compound, converting the silver compound to silver carbonate or silver oxide, and further impregnating the support with a $CO_2$ sorption promoter. Prior to use as a sorbent, the silver carbonate is converted to silver oxide via the application of heat; liberating $CO_2$ and $H_2O$.

5 Claims, No Drawings

REGENERABLE CO₂/H₂O SOLID SORBENT

This is a division of copending application Ser. No. 07/544,716 filed on Jun. 27, 1990 now U.S. Pat. No. 5,091,358.

TECHNICAL FIELD

This invention relates to a solid sorbent, and especially to the removal of carbon dioxide and water from a gaseous stream using a regenerable solid sorbent.

BACKGROUND ART

Carbon dioxide ($CO_2$) and/or water removal from gaseous streams can be an essential process in many systems. In industry, purification of input gases for oxygen rich processes, such as a fuel cell system, is important. In enclosed environments, the removal of $CO_2$ can be critical.

Absorbents, such as soda lime, which react with the $CO_2$, are commonly utilized for this application. However, this process is only satisfactory for short term applications due to the irreversible nature of the reaction. For long term durations, regenerable sorbents were developed, such as an amine solution system. However, this solution is impractical in conditions of less than 0.2 volume percent $CO_2$ in air, has limited life due to amine solution decomposition, and is impractical for use in microgravity applications.

Improved regenerable sorption systems are disclosed in U.S. Pat. Nos. 3,511,595, 3,865,924, and 4,822,383. U.S. Pat. No. 3,511,595 teaches removing $CO_2$ and water vapor from air by reacting with potassium carbonate, forming potassium bicarbonate, with control temperatures ranging from 40° F. to 100° F. The bed is regenerated at somewhat over 200° F.

U.S. Pat. No. 3,865,924 teaches utilizing a regenerable absorbent, composed of a mixture of finely divided alkali metal carbonate and alumina, which absorbs faster than pure carbonate alone. The sorption occurs at room temperature or slightly above (up to about 140° F.), while regeneration is preferably run at high temperatures up to about 300° F.

The utilization of a regenerable solid amine system is taught by U.S. Pat. No. 4,822,383. The process includes utilizing a plurality of beds, each having three states, adsorption state wherein the bed adsorbs the $CO_2$ from the air, desorption state wherein steam desorbs the $CO_2$ from the bed, and dewatering state wherein the condensate is removed from the bed.

Due to the expanded use of enclosed environments, what is needed in the art is a regenerable $CO_2/H_2O$ sorbent with extended cycle life.

DISCLOSURE OF INVENTION

This invention discloses a process for producing a regenerable $CO_2/H_2O$ sorbent. The sorbent is comprised of a silver compound, a $CO_2$ sorption promoter, and a support. The preparation includes impregnating the support with an aqueous solution of a silver compound, converting the silver compound to an insoluble silver compound, and then further impregnating the impregnated support with an aqueous solution of a $CO_2$ sorption promoter.

The foregoing and other features and advantages of the present invention will become more apparent from the following description.

BEST MODE FOR CARRYING OUT THE INVENTION

Typical supports which are well known in the art for use as a support for a catalyst or sorbent can be used. High surface area supports, with granular sizes between about 20 mesh to about 30 mesh, surface areas between about 10 m²/g and about 100 m²/g, and which can be packaged in a packed bed configuration are preferred for this process. For example, alumina, calcined diatomaceous earth, or magnesia can be utilized. The support must be chemically and physically stable to a minimum temperature of about 300° C. Celite TM, calcined diatomaceous earth, produced by Manville Corp., Filtration and Minerals Division, Lompoc, Calif., or alumina is especially preferred.

Silver compounds which can be converted to a form which absorbs $CO_2$ and which can be regenerated by the desorption of $CO_2$, can be utilized. Silver compounds, readily convertible to silver carbonate or silver oxide and whose conversion by-product(s) are readily removable from the support, are preferred. The preferred silver compounds include, but are not limited to, silver nitrate, silver fluoride, silver oxide, and silver carbonate.

A consideration which affects the determination of an appropriate silver compound to be used is the solvent in which the compound will be dissolved prior to impregnation. The silver compound should be easily dissolved in order to permit the impregnation of the support. Therefore, possible solvents include any solvent in which the silver compound can be dissolved and which will not degrade or reduce the silver or the support. Note, organic solvents reduce silver and are therefore unacceptable. Possible solvents include: water, and aqueous solutions of ammonium hydroxide, nitric acid, and sodium thiosulfate (hereafter referred to as aqueous solution).

Reactants which convert the silver compound to an insoluble silver compound, such as silver carbonate or silver oxide, the forms typically used for $CO_2$ sorption, can be used (hereafter referred to as reactant). Typical reactants include any alkali metal carbonates or hydroxides, which react with the silver compound utilized to form silver carbonate or silver oxide, respectively, and whose by-products can be removed from the support. The preferred alkali metals include sodium, potassium, and cesium, with cesium carbonate and potassium carbonate the especially preferred alkali metal compounds.

Since the reaction between silver oxide and $CO_2$ has a relatively slow rate of reaction, a compound which promotes the $CO_2$ absorption is useful for reasons of increased efficiency. The $CO_2$ sorption promoter is selected according to its alkalinity. A compound capable of absorbing $CO_2$ which has a high alkalinity, pH greater than about 11, can increase the rate of $CO_2$ sorption. A pH greater than about 12 is especially preferred. Any highly alkaline metal salt capable of absorbing $CO_2$ can be used as a $CO_2$ sorption promoter. Alkali metal salts, such as cesium, sodium, and potassium are preferred, with cesium and potassium especially preferred. Note, it is recognized that the use of lithium as a $CO_2$ sorption promoter is feasible. However, due to lithium's relatively low solubility it is impractical.

The $CO_2/H_2O$ solid sorbent preparation in the present invention is comprised of forming a silver oxide or carbonate impregnated support. The support is further impregnated with a $CO_2$ sorption promoter to enhance the rates of reaction. If the silver is in the form of silver carbonate, the sorbent is activated by the liberation of $CO_2$.

Preparation of the sorbent is accomplished by impregnating a support with a silver compound, and drying the impregnated support. Impregnation consists of intimately contacting the support with an aqueous solution of the silver compound. Any conventional method to ensure intimate contact, such as ultrasonic blending, continuous stirring, circulation pump/impeller blade combination, vacuum impregnation, among others, can be used. For example, the impregnation of the support can be conducted in a rotating vacuum flask which is immersed within a control temperature bath maintained between about 60° C. to 95° C., which ensures intimate contact and minimal processing times.

The silver compound is then converted to silver carbonate or silver oxide by contacting the impregnated support with a reactant. Sufficient reactant to convert all of the silver compound to silver carbonate or silver oxide is used. The impregnated support is washed to remove excess reactant and the water soluble by-products of the chemical conversions.

In order to enhance the $CO_2$ sorption process reaction rates, the impregnated support is further impregnated with a $CO_2$ sorption promoter. Again, impregnation consists of intimately contacting the support with a solution of a $CO_2$ sorption promoter using the techniques described for the silver compound impregnation of the support. Note, between each respective step, the impregnated support is dried by adding heat. The support can be heated to temperatures up to 150° C. to hasten the drying process, while temperatures between about 80° C. and 100° C. are preferred. If ambient contacting process is utilized, hot purge gas can be used to evaporate the water.

This preparation process can be simplified by directly impregnating the support with silver carbonate or silver oxide, therefore eliminating the need for the conversion step. This may be accomplished by utilizing a solvent in which silver oxide or silver carbonate can be dissolved. For example, silver oxide or silver carbonate is dissolved in either ammonium hydroxide solution, nitric acid solution, or sodium thiosulfate solution (note silver carbonate is insoluble in sodium thiosulfate solution). The support is impregnated with the silver oxide or silver carbonate in solution and dried. The support is then impregnated with the $CO_2$ sorption promoter. This direct impregnation with silver carbonate or silver oxide eliminates the conversion step discussed above.

The amount of silver compound versus $CO_2$ sorption promoter is a balance between $CO_2$ absorbancy, greater silver compound, and $H_2O$ absorbancy, $CO_2$ sorption promoter. The range is typically from about 10 wt % to about 70 wt % silver compound with the balance $CO_2$ sorption promoter. The preferred wt % silver compound is between about 20 wt % to about 40 wt %, balance $CO_2$ sorption promoter. With respect to the final $CO_2/H_2O$ solid sorbent, the total loading of silver compound is typically between about 6.0 wt % and about 40.0 wt %, with about 30 wt % to 70 wt % $CO_2$ sorption promoter, and the balance being the support.

Preparing the sorbent for use may require activation. If the silver is in the carbonate form, it is "saturated", incapable of $CO_2$ sorption, and must be activated. Activation of the sorbent is accomplished by converting the silver carbonate to silver oxide. Any method conventionally known in the art which will not degrade the sorbent can be used, such as applying heat, thereby liberating $CO_2$. The heating technique of activation merely consists of heating the sorbent to a temperature sufficient to convert the silver carbonate to silver oxide, between about 160° C. to about 220° C. Note, temperatures above about 250° C. will result in decomposition of the oxide to silver and oxygen, a form incapable of $CO_2$ absorption. Therefore, it is preferred that an activation temperature below about 245° C. be used.

$CO_2/H_2O$ removal from a gaseous stream consists of intimately contacting the gaseous stream contaminated with $CO_2$ and $H_2O$ with the sorbent at temperatures below the desorption temperatures, below about 160° C. The $CO_2$ sorption promoter reacts with the contaminants, typically to form bicarbonate. The silver oxide then reacts with the $CO_2$ sorption promoter, forming silver carbonate and $H_2O$, and regenerating the $CO_2$ sorption promoter. The water reacts with the $CO_2$ sorption promoter to form various hydrates. The transfer of the $CO_2$ from the $CO_2$ sorption promoter to the silver leaves the $CO_2$ sorption promoter uninhibited for further $CO_2$ and $H_2O$ removal from the contaminated stream.

Once the silver oxide is saturated, converted to the carbonate form, the $CO_2/H_2O$ sorbent loses its absorption capabilities and must be regenerated or activated. Although any process capable of liberating the $CO_2$ without degrading the sorbent can be utilized, typically a heating process is used. The sorbent is heated to a temperature sufficient to liberate the $CO_2$ and $H_2O$; converting the silver carbonate to silver oxide. Typically temperatures between about 160° C. to about 220° C. are sufficient for $CO_2$ liberation. Once the bed has been reactivated it is again ready to adsorb the $CO_2$ and $H_2O$ from the gaseous stream.

EXAMPLE I

The following process was utilized to produce a $CO_2/H_2O$ sorbent comprised of: 44.2 weight (wt) % cesium carbonate and 9.3 wt % silver carbonate, and the balance Celite.

1. A Celite support, 60.0 grams (g), was vacuum impregnated with a solution of 6.4 g of silver nitrate and 40.0 milliliters (ml) of water for 5.0 minutes at ambient temperature.
2. The impregnated support was dried at 90° F.
3. The silver nitrate was converted to silver carbonate by intimately contacting the support with a solution containing 30.0 g of cesium carbonate and 40.0 ml water (sufficient cesium carbonate to convert all of the silver nitrate), and then dried as in step 2.
4. The support was rinsed 4 times with distilled water to remove any excess cesium carbonate and cesium nitrate resulting from the silver nitrate/cesium carbonate reaction in step 3. As in step 2, the support was again dried
5. The support was then vacuum impregnated for 5.0 minutes at ambient temperature with an aqueous cesium carbonate solution which contained 46.0 g cesium carbonate and 40.0 ml water.

Sorption tests were conducted on the above described sorbent, containing 9.3 wt % silver carbonate, 44.2 wt % a $CO_2$ sorption promoter, on 14–18 mesh Celite granules. The resultant capacity was typically about 1.9 lb./ft$^3$ for $CO_2$, and 2.2 lb./ft$^3$ for $H_2O$ with bed residence times of between about 2 to 4 seconds.

EXAMPLE II

The following process was utilized to produce a $CO_2/H_2O$ sorbent comprised of: 44.2 weight (wt) % cesium carbonate and 9.3 wt % silver carbonate, and the balance Celite, without having to convert the silver compound to silver carbonate or silver oxide.

1. A Celite support, 60.0 grams (g), was vacuum impregnated with a solution of 6.4 g of silver carbonate and 40.0 milliliters (ml) of ammonium hydroxide for 5.0 minutes at ambient temperature.
2. The impregnated support was dried at 90° F.
3. The support was then vacuum impregnated with an aqueous cesium carbonate solution which contained 46.0 g cesium carbonate and 40.0 ml ammonium hydroxide for 5.0 minutes at ambient temperature.

The $CO_2/H_2O$ sorbent of this example was not tested since the composition was identical to the $CO_2/H_2O$ sorbent prepared in the first example. It is believed that if test had been run, the results would also be identical to those from the first example.

The sorbent prepared in the present invention exhibits absorption/desorption cyclical life of greater than 40 cycles. Unlike the unsupported sorbent which encounters structural integrity problems typically around 20 cycles, this sorbent has proven to retain structural integrity and maintain a consistent $CO_2$ absorption/desorption capabilities beyond 50 cycles. Additionally, the sorbent itself is capable of adsorbing $CO_2$ and $H_2O$ without mixing a desiccant with the sorbent or using two sorbents (in separate sorbent beds), one for $CO_2$ and one for $H_2O$.

Although this invention has been shown and described with respect to detailed embodiments thereof, it will be understood by those skilled in the art that various changes in form and detail thereof may be made without departing from the spirit and scope of the claimed invention.

We claim:

1. A method for removing $CO_2$ and $H_2O$ from a gaseous stream, comprising the steps of:
   a. contacting a gaseous stream containing $CO_2$ and $H_2O$ with a $CO_2$ and $H_2O$ sorbent prepared by a process comprising the steps of:
      i. preparing an aqueous solution of a silver compound;
      ii. impregnating a support with said aqueous solution to form an impregnated support;
      iii. reacting said silver compound with an alkali metal compound to convert said silver compound to an insoluble silver compound;
      iv. washing said impregnated support;
      v. preparing an aqueous solution of a $CO_2$ sorption promoter, wherein said $CO_2$ sorption promotor has a pH of at least 11;
      vi. further impregnating said impregnated support with said aqueous solution of $CO_2$ sorption promoter;
      vii. drying said further impregnated support; and
      viii. converting said insoluble silver compound to silver oxide;
   b. absorbing said $CO_2$ and said $H_2O$ into said sorbent.

2. A method as in claim 1 wherein said $CO_2$ absorption promoter is an alkali metal salt.

3. A method as in claim 2 wherein said alkali metal salt is cesium carbonate, potassium carbonate, or sodium carbonate.

4. A method as in claim 1, wherein said sorbent comprises about 30 wt % to about 70 wt % alkali metal salt and about 6 wt % to about 40 wt % silver oxide, with the balance being a support.

5. A method as in claim 1 wherein the support is alumina, calcinated diatomaceous earth, or magnesia.

* * * * *